(12) United States Patent
Fei et al.

(10) Patent No.: US 7,961,795 B2
(45) Date of Patent: Jun. 14, 2011

(54) CHANNEL ESTIMATION

(75) Inventors: Zesong Fei, Beijing (CN); Lei Wan, Beijing (CN); Jingming Kuang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 773 days.

(21) Appl. No.: 11/665,782

(22) PCT Filed: Oct. 29, 2004

(86) PCT No.: PCT/CN2004/001231
§ 371 (c)(1),
(2), (4) Date: Nov. 26, 2007

(87) PCT Pub. No.: WO2006/045219
PCT Pub. Date: May 4, 2006

(65) Prior Publication Data
US 2008/0192842 A1    Aug. 14, 2008

(51) Int. Cl.
*H04K 1/10*    (2006.01)
(52) U.S. Cl. ......................... 375/260; 375/316
(58) Field of Classification Search ................... 375/260, 375/316
See application file for complete search history.

(56) References Cited

U.S. PATENT DOCUMENTS

| | | | |
|---|---|---|---|
| 5,937,015 A | 8/1999 | Dent et al. | |
| 6,314,148 B1 | 11/2001 | Fulghum | |
| 6,347,125 B1 | 2/2002 | Dent | |
| 6,452,917 B1 | 9/2002 | Leung | |
| 2002/0191578 A1 | 12/2002 | Bachl et al. | |
| 2003/0058823 A1 | 3/2003 | Nishimura | |
| 2004/0085917 A1* | 5/2004 | Fitton et al. | 370/292 |
| 2004/0105382 A1 | 6/2004 | Miyoshi et al. | |

FOREIGN PATENT DOCUMENTS

| | | |
|---|---|---|
| EP | 1 263 179 | 12/2002 |
| EP | 1447932 | 8/2004 |
| JP | 2001-339325 | 12/2001 |
| JP | 2002-541714 | 12/2002 |
| JP | 2003-032146 | 1/2003 |
| JP | 2003-069530 | 3/2003 |

(Continued)

OTHER PUBLICATIONS

International Search Report for PCT/CN2004/001231 mailed Apr. 7, 2005.

(Continued)

*Primary Examiner* — Shuwang Liu
*Assistant Examiner* — Michael R Neff
(74) *Attorney, Agent, or Firm* — Nixon & Vanderhye P.C.

(57) ABSTRACT

The channel estimation for a current data block is based on a previous data block, where the two data blocks are based on common information. Data symbol hypotheses of the previous data block can be forwarded to a channel estimator and used as known reference symbols when estimating the channel response for the current block. Alternatively, a combination of the data symbol hypotheses and preliminary data symbol estimates of the current block are used as reference symbols in a refined channel estimation for the current block. Data bit hypotheses of the previous block can also be input as a priori data in a preliminary demodulation of the current block. The demodulator output is used as reference data in a refined channel estimation for the current block. The technology is well-adapted for use in connection with Hybrid ARQ.

11 Claims, 11 Drawing Sheets

FOREIGN PATENT DOCUMENTS

| JP | 2003-110460 | 4/2003 |
| JP | 2003-115783 | 4/2003 |

OTHER PUBLICATIONS

Summary of Japanese official action, Jun. 25, 2010, in corresponding Japanese Application No. 2007-538238.
Matthew C. Valenti and Brian D. Woemer, "Iterative channel estimation and decoding of pilot symbol assisted turbo codes over flat-fading channels", IEEE Journal on Selected Areas in Communications, vol. 19, No. 9, pp. 1697-1705, Sep. 2001.
Anna Zhuang and Markku Renfors, "Combined pilot aided and decision directed channel estimation for the RAKE receiver", Proc. Vehicular Technology Conference 2000, pp. 710-713, Sep. 2000.
Aik Chindapol and James A. Ritcey, "Design, analysis, and performance evaluation for BICM-ID with square QAM constellations in Rayleigh fading channels", IEEE Journal on Selected Areas in Communications, vol. 19, No. 5, pp. 944-957, May 2001.

* cited by examiner

CHANNEL ESTIMATION

This application is the U.S. national phase of international application PCT/CN2004/001231 filed 29 Oct. 2004, which designated the U.S., the entire content of which is hereby incorporated by reference.

TECHNICAL FIELD

The present invention generally relates to radio communications systems, and in particular to improved channel estimation in such systems.

BACKGROUND

In a radio communications system, information data (bits) are translated into symbols in a transmitter. The symbols are then further processed, e.g. expanded by a spreading factor, encoded, etc., before transmission to a receiver. The transmitted signal (symbols) typically propagates through a dispersive medium and arrives at the receiver via multiple paths or channels. In order to efficiently process the received multipath signals and retrieve the information data carried therein, the channel responses (transfer function) for the different channels (paths) have to be estimated in the receiver. Several channel response estimating techniques are known in the art.

Many of those estimating techniques utilize known control data, so-called pilot data or symbols, included in the transmitted signal. This pilot data is modulated at the transmitter only with known symbols to permit the receiver to obtain a coherent reference that is independent of the unknown information symbols being decoded. The receiver estimates the channel responses based on these received pilot symbols and locally generated or stored pilot reference symbols. The so-obtained channel response estimates are then used for processing the received signals and for retrieving the information data therefrom.

Generally, the more pilot data included in the transmitted signal, the more accurate channel response estimations can be performed in the receiver. However, increasing the pilot data content of the signal will reduce the information data throughput of the transmission since such pilot data content increase comes at the expanse of the amount of (useful) information data that can be carried in the transmitted signal. As a consequence, much effort is invested in improving the channel response estimations without requiring an increase in pilot data content.

Matthew C. Valenti and Brian D. Woerner, "Iterative channel estimation and decoding of pilot symbol assisted turbo codes over flat-fading channels", *IEEE Journal on Selected Areas in Communications*, Vol. 19, No. 9, pp. 1 697-1 705, September 2001 describe an iterative channel estimation (ICE) technique. In this ICE, the receiver estimates an initial or preliminary channel response based on pilot symbols included in the received signal. The channel response estimate is multiplied by the received sequence (signal). The result is passed to a demultiplexor, which strips off the pilot symbols. Next, the sequence is passed though a channel deinterleaver and finally to a turbo decoder. This turbo decoder outputs log-likelihood ratio (LLR) estimates of the code symbols. Hard or soft decisions of the code symbols are then determined based on the LLR-values. The symbol estimates are reinterleaved and the (demultiplexed) pilot symbols are reinserted. This whole symbol sequence (including pilot symbols and the tentative information symbol estimates) is fed back to the channel estimator and is used as a known reference sequence for a new (refined) channel estimation using the same received signal. This iterative process with symbol feed backs is repeated several times until accurate channel estimates are obtained.

Although the ICE technique with turbo decoding feedback is rather reliable, this comes at the expanse of high computational complexity and cost and high processing delay. In addition, all received symbols have to be stored and the final deinterleaving and decoding of a received signal have to be put on hold until the iterative process is finished, which might take a non-negligible period of time. As a consequence, a large amount of extra memory is required in a receiver employing ICE. Taken together, these disadvantages make ICE unsuitable for practical implementations in a receiver.

Anna Zhuang and Markku Renfors, "Combined pilot aided and decision directed channel estimation for the RAKE receiver", *Proc. Vehicular Technology Conference* 2000, pp. 710-713, September 2000 present an alternative solution to ICE, denoted combined pilot aided and decision directed channel estimation. According to this document, a receiver determines a first channel estimate from reference pilot symbols and received pilot symbols. Data symbols in the received signal are then estimated using this first channel estimate. Decisions are made about the estimated data symbols and these decisions are then used together (as known reference) with the received signal for determining a second channel estimate. A discriminator is utilized for determining which of these two channel estimates to use for the received signal.

Although, this solution has lower complexity than ICE, the probability of error data symbol decision is high and it has a low convergence speed. As a consequence, a much lower performance compared to ICE is obtained.

SUMMARY

The present invention overcomes these and other drawbacks of the prior art arrangements.

It is a general object of the present invention to provide improved channel estimation with low computational complexity.

It is a particular object of the invention to provide a channel estimation that improves coding performance of a receiver.

It is another particular object of the invention is to provide a receiver structure that uses information from a previous data transmission in the channel estimation of a current data transmission.

These and other objects are met by the invention as defined by the accompanying patent claims.

Briefly, the present invention involves channel estimation in radio communications systems employing transmissions of radio or data blocks that are based on common information. According to the invention, the channel response estimation of a current data block is, at least partly, based on a previous data block, received in a previous different data transmission from the same transmitter. In addition, the current block comprises at least a subset of data symbols representing data bits that are associated with the previous data block. The repeat transmission of data blocks can arise from an unsuccessful decoding of the previous data block in the receiver, which in turn causes the transmitter to retransmit the data block or transmit a new data block that might not be identical to the previous block but are at least based on common information.

When this receiver receives a first data block in a first transmission from the transmitter, the data block is provided to the channel estimator. This estimator determines a channel response for the first data block, for example by utilizing known pilot symbols included therein. The resulting channel response is used for modulating the received data symbols of the first block to generate data symbol estimates. These symbol estimates are then demodulated and the resulting data bit estimates from the demodulation are provided to a decoder. This decoder tries to decode the bit estimates and, thus, the first data block. However, if the decoding is not successful, the receiver preferably notifies the transmitter accordingly. As a consequence, the transmitter can then retransmit the data block or transmit another data block that includes at least some of the data symbols found in the first block. In addition, the decoder generates data bit hypotheses of the data bit estimates of the first block and temporarily stores them in a memory.

Once the receiver receives this second data block, the data bit hypotheses can be fetched from the memory and modulated into data symbols hypotheses. Since the first and second data block are based on common data bits, these data symbol hypotheses can be used as known reference symbols similar to pilot symbols when determining the channel response for the second data block. If the second data block includes pilot symbols both the data symbol hypotheses of the first block and locally generated or stored reference pilot symbols can be used as known reference symbols.

Thus, more reference symbols (the symbol hypotheses and the pilot symbols) are utilized in the channel estimation than prior art solutions that only employ a few pilot symbols. Furthermore, this increase in the number of reference symbols for the purpose of channel estimation can be obtained without any increase in the number of pilot symbols that have to be included in the data block and, thus, without any reduction in the information data throughput. As a consequence, a much more accurate channel estimation for this second data block will be obtained, which in turn enables a more accurate estimation of the data bits of the block and increased probability of successful decoding.

In another embodiment of the invention, an initial or preliminary channel response can first be estimated for the second data block by e.g. using pilot symbols included in the data block. This preliminary channel response is used to determine (preliminary) data symbol estimates for the second data block. These symbol estimates are combined with the modulated data bit hypotheses of the first block to obtain combined reference symbols. Alternatively, the data symbol estimates of the second block could first be demodulated into (preliminary) data bit estimations and then the combination could be performed on the bit-level.

In either case, the resulting combined reference information is input to the channel estimator of the receiver and is used in a refined channel response estimation for the second block. Thus, since more reference data can now be used in the refined channel estimation than for the preliminary estimation, a more accurate channel response is obtained. This more accurate channel response in turn enables more accurate estimations of the data bits of the second data block and increased probability of successful decoding. This increased probability of successful decoding will lower need of retransmitting data blocks from the transmitter to the user, which affects the user throughput positively.

In a further embodiment of the invention, preliminary data symbol estimates of the second data block are obtained according to the foregoing. The stored data bit hypotheses of the first block are then input as a priori information in the demodulation of the preliminary data symbol estimates. These data bit hypotheses will thus be used as reference information in the demodulation of the second data block and thereby increase the accuracy of the demodulation, resulting in better data bit estimations for the second data block. The resulting data bit estimations can be brought back to the channel estimator and used as known reference information in a refined channel estimation for the second data block. Since the reference information has been obtained from an enhanced demodulation procedure using data bit hypotheses of the previous first block, the quality of this reference information is very high, which in turn enables accurate channel response estimations.

The present invention is well-adapted for the repeat transmission technique denoted Hybrid Automatic Repeat Request (HARQ) and for the different HARQ modes, including Chase Combining (CC), Partial Incremental Redundancy (PIR) and Full Incremental Redundancy (FIR).

The invention offers the following advantages:

Improves the channel estimation performance of repeat transmissions;

Enables decreased probability of erroneous data symbol decision;

Improves the demodulation and decoding performance and single user throughput; and Has low computational complexity and low memory and delay requirements.

Other advantages offered by the present invention will be appreciated upon reading of the below description of the embodiments of the invention.

SHORT DESCRIPTION OF THE DRAWINGS

The invention together with further objects and advantages thereof, may best be understood by making reference to the following description taken together with the accompanying drawings, in which:

FIG. 13 is a flow diagram illustrating additional steps of the estimation method of FIG. 12;

FIG. 15 is a flow diagram illustrating additional steps of the estimation method of FIG. 12.

DETAILED DESCRIPTION

Figure 1:
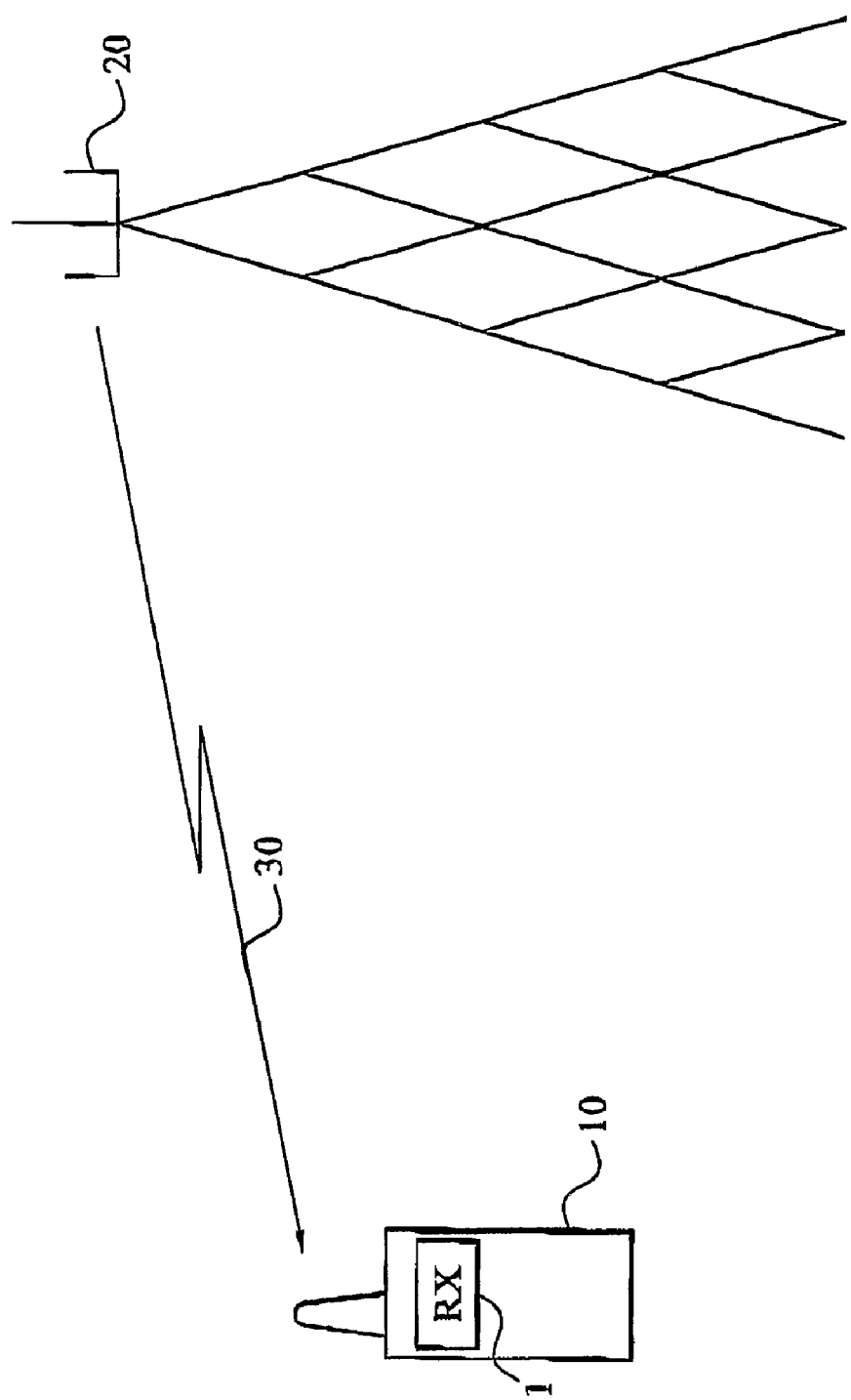
FIG. 1 is schematic overview of a portion of a radio communications system, to which the present invention can be applied.

Throughout the drawings, the same reference characters will be used for corresponding or similar elements.

The present invention relates to channel estimation in radio communications systems employing transmissions of radio or data blocks that are based on common information. In other words, a data block received in a first transmission is used in the channel estimation of a second data block received in a subsequent different data transmission and where the two data blocks are based on common information.

FIG. 1 is a schematic overview of a portion of a radio communications system, to which the teachings of the present invention can be applied. The communications system could be a Global System for Mobile communication (GSM) system, a General Packet Radio System (GPRS), an Enhanced GPRS (EGPRS) system that adopts the Enhanced Data rates for GSM Evolution (EDGE) technique, a Universal Mobile Telecommunications System (UMTS), or any other communications system utilizing whatsoever multiple access method, e.g. a Time Division Multiple Access (TDMA) system, a Frequency Division Multiple Access (FDMA) system, different Code Division Multiple Access (CDMA) systems, e.g. Direct Sequence CDMA (DS-CDMA) or Wideband CDMA (WCDMA), a Orthogonal Frequency Division Multiple Access (OFDMA) system, or a system employing a combination of multiple access methods.

In this FIG. 1, a transmitter or transmitting unit is represented by a base station 20 that conducts data communication with a mobile unit 10 having a receiver 1. However, the mobile unit 10 in turn generally also includes a transmitter and the base station 20 then includes a receiver.

As is well known in the art, when the transmitter 20 wants to communicate data to the receiver 1, information or data bits are generally modulated or translated (using a symbol alphabet) into data symbols that may be further processed, e.g. encoded, expanded by a spreading factor, etc. before transmission on a radio channel or link 30 to the receiver 1.

When the transmitted data signal carrying the data symbols propagates through the (air) medium, it will become modified. As a consequence, in order to successfully process (demodulate and decode) the received signal, the receiver 1 has to estimate this modifying effect or channel (impulse) response (sometimes denoted transfer function) of the radio channel 30. If a transmitted data signal is represented by $x_k$, k=1 ... M, where M is the number of data symbols in a data block, and the channel response is denoted $\alpha_k = A_k e^{j\Theta_k}$, where $A_k$ is an amplitude scaling and $e^{j\Theta_k}$ is a phase rotation introduced by the channel 30, then the received signal (data block) can be represented by $y_k = \alpha_k x_k = x_k A_k e^{j\Theta_k}$. A task of the receiver 1 is to determine an estimation $\hat{\alpha}$ of the channel response for the data symbols in the data block.

In the present invention this channel response estimation is performed (at least partly) based on information or data hypotheses of a previous data block received in a previous different transmission from the same transmitter 20.

Figure 2:
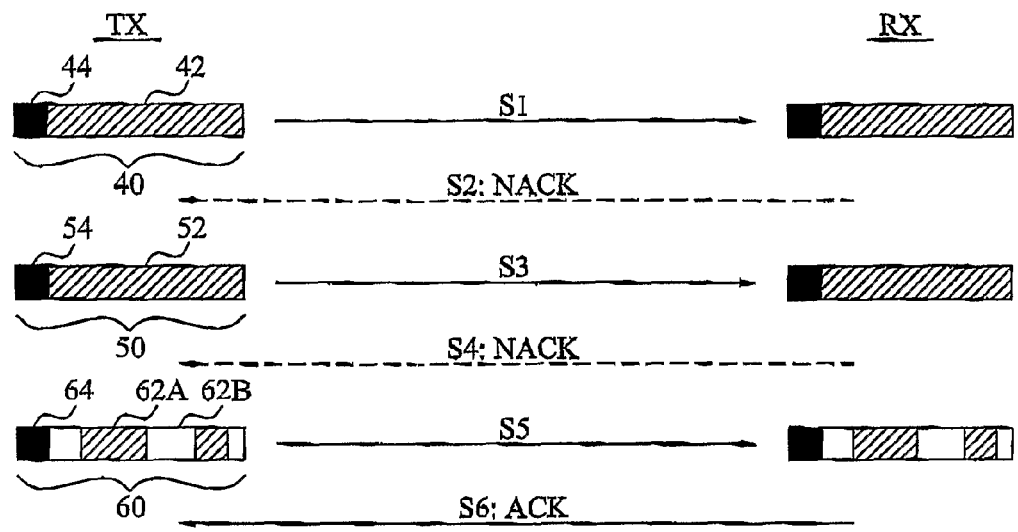
FIG. 2 is a data signaling diagram illustrating successive data block transmissions according to the present invention.

FIG. 2 schematically illustrates such a data communication between a transmitter (TX) and a receiver (RX) that employs multiple different data block transmissions.

The transmitter firstly generates a first data block 40 of data symbols 42 to be transmitted to the receiver. In addition to the data or information symbols 42, the data block 40 could include or otherwise be associated with so-called pilot symbols 44. These known pilot symbols 44 can then be used by the receiver for simplifying and, above all, enhancing the channel estimation. As was briefly mentioned in the background, pilot data is modulated at the transmitter only with known symbols to permit the receiver to obtain a coherent reference that is independent of the unknown information symbols 42 in the data block 40. The receiver estimates the channel responses based on these received pilot symbols 44 and locally generated or stored pilot reference symbols.

These pilot symbols 44 can be inserted in the beginning of the data block 40, in the end thereof, or multiplexed into the information symbols 42. The number of pilot symbols 44 to use for a given number of information symbols 42 in a data block 40 can be selected based on different (optimization) techniques in the art.

Thus, this generated data block 40 with pilot 44 and information 42 symbols is transmitted in step S1 from the transmitter to the receiver. The receiver will process the data block 40 and try to decode it. In cases where the decoding of the data block is not successful, the receiver could return a Negative Acknowledgement (NACK) to the transmitter in step S2. Upon reception of the NACK, the transmitter may generate and transmit (in step S3) a second data block 50 that is based on at least some information bits (symbols) 52 as the first, previously transmitted, data block 50. Although, the second data block 50 can been seen as an identical copy (if the second data block 50 contains all the information symbols 42 found in the first data block 42), possibly except the pilot symbols 54, of the first data block 40 at the transmitter, the two data blocks 40, 50 generally differ at the receiver. This is due to that the modifying effect (channel response) of the channel has been changed between the two transmissions.

If decoding still is not successful in the receiver, despite the possibility of utilizing data both in the first and second data block, the receiver may anew return a NACK in step S4. A third data block 60 with pilot 64 and information 62A, 62B symbols is then provided in the transmitter. Contrary to the second data block 50, this third block 60 could include a first set of information symbols 62A that are identical to some of the data symbols 42 in the first block 40 (more correctly, includes a first set of information symbols 62A that are based on the same data bits as at least a portion of the data symbols 42 of the first block 40). A second set of information symbols 62B does then not necessarily have to have correspondences in the first block 40. This third block 60 is communicated to the receiver in step S5. If decoding is now successful the receiver could return an Acknowledgement (ACK), informing the transmitter that no more (re)transmissions of data blocks are required.

The example discussed above and disclosed in FIG. 2 should merely been seen as an illustrative example of how multiple transmissions of data blocks that are based on common information can be implemented and the invention is not limited thereto. Thus, it could be possible that the transmitter only uses data block retransmissions so that any subsequently transmitted data block will carry the same information as the original or first data block (first data block vs. second block in FIG. 2). Alternatively, only portions of two data blocks need to be based on common information (first or second data block vs. third block in FIG. 2), or a combination of the two solutions can be used as is illustrated in FIG. 2.

Note further that this multiple transmission scheme can be implemented without any NACK signaling. For example, if the transmitter has not received an ACK from the receiver within a predefined period of time, it will (re)transmit a new data block to the receiver.

A typical example of repeated data block transmission is Hybrid Automatic Repeat Request (HARQ). The HARQ scheme can use the energy from a previously erroneous transmission in order to improve the chances of decoding on retransmission. HARQ is a special type of ARQ which combine different transmissions of the same data block prior to decoding. As is known in the art, there are two main schemes for HARQ: Chase Combining (CC) and Incremental Redundancy (IR). In the CC scheme, the retransmitted data block is based on identical bits as a previous (original) data block. In the IR scheme, each data block is encoded with redundancy and punctured into a number of versions, often referred to as sub-blocks for transmission to the receiver. The sub-blocks can be produced all at once and stored for use as and when required by the HARQ scheme, or alternatively each particular version or sub-block is produced dynamically upon request (reception of NACK). Incremental redundancy exists in two forms Partial IR (PIR) and Full IR (FIR). In PIR a retransmission carry partly identical bits and partly incremental bits to the initial transmission, whereas in FIR the retransmission carry only incremental redundancy bits to the initial transmission and is self-decodable.

Thus, in FIG. 2 the second data block could be seen as generated according to the CC scheme, whereas the third data block is then according to PIR or FIR. As a consequence, the present invention is well adapted for usage in a receiver employing HARQ, but is not limited thereto.

Figure 3:
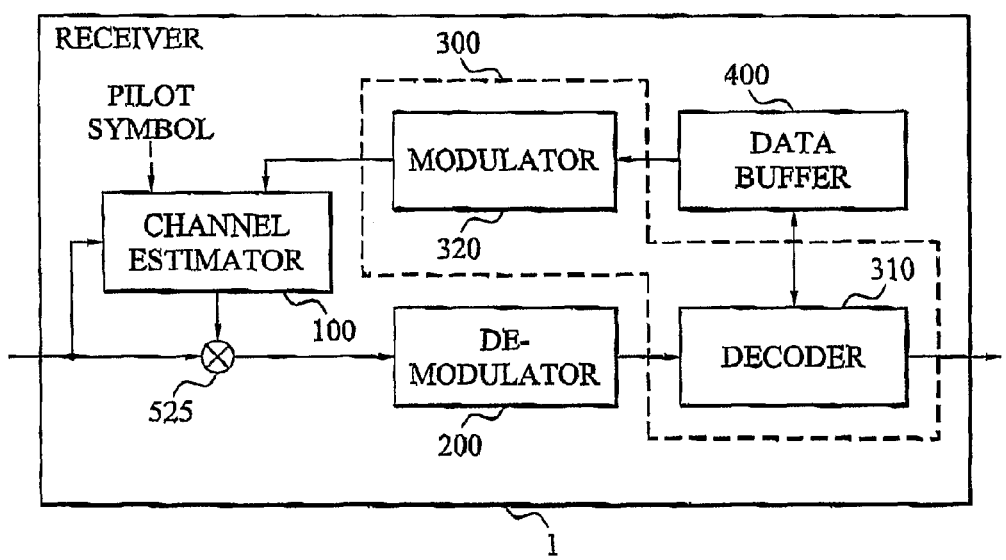
FIG. 3 is a schematic block diagram of an embodiment of a receiver according to the present invention.

FIG. 3 is a schematic block diagram of a receiver 1 according to an embodiment of the present invention. This receiver 1 generally includes a channel estimator 100, a demodulator 200, a data buffer or storage 400 and a data processor 300.

When this receiver 1 receives a first data block in a first transmission from the transmitter the data block is forwarded to the channel estimator 100. This estimator 100 will then determine a channel response (transfer function) estimation for the data block transmission over a radio channel in order to enable the receiver 1 to further process, e.g. demodulate and decode, the data block. This estimator 100 can be configured for employing any channel estimation technique known in the art for estimating the channel response for this first data block transmission. However, in some embodiments it is preferred to use pilot data or symbols included in or otherwise associated with the first data block. Instead of using pilot symbols multiplexed into the data block, a (dedicated) pilot channel can be used in addition to the separate data channel. Then both these channels preferably transmit in parallel (although they may be at different rates). The estimator 100 can use this pilot data received on the pilot channel for a (rough) estimation of the channel response of the data channel.

Thus, if the received symbols in the data block can be represented by $y_k = \alpha_k x_k$, the channel estimator 100 uses locally generated or stored pilot reference symbols $(x_j, j=1 \ldots N_p$, where $N_p$ is the number of pilot symbols associated with the data block). Thus, since $y_j$ is the received data and $x_j$ is known, $\alpha_j$ can be determined by the estimator 100. As a consequence, the output of the channel estimator 100 is a channel response estimate $\hat{\alpha}$ for the first data block (transmission). The estimate is brought together with the first data block to a modifying element or unit 525 that modifies the received data symbols of the block with the channel estimate to obtain estimations of the data symbols. For example, the estimator output could be a complex conjugate of the channel response $\hat{\alpha}^*$. The modifying unit 525 could then be configured for multiplying this complex conjugate with the received data symbol sequence (possibly after demultiplexing out or removing the pilot symbols therefrom) to obtain the symbol estimations $\hat{x}_k$:

$$\hat{\alpha}^* \times y_k = x_k(\hat{\alpha}^* \times \alpha_k) \approx \hat{x}_k. \quad (1)$$

If any pilot symbols has not yet been removed from the estimated symbols sequence, a demultiplexor or corresponding symbols removing unit (not illustrated) can be arranged between the modifying unit 525 and the demodulator 200 for removing pilot symbols from the symbol sequence. In either case, the symbols sequence is input to the demodulator 200, where it is processed (demodulated) and translated into a sequence of estimated (coded) data bits. The bits sequence is brought from the demodulator to a connected data processor 300, where a decoder 310 will (try to) decode the data bits. In addition, the processor 300 or the decoder 310 of the processor generates (decoded) data bit hypotheses of at least a subset of estimated data bits. Thus, data bit hypotheses can be determined for all the estimated bits or only for a portion thereof. These data bit hypotheses will be used in the channel estimation for a subsequent data block transmission. As a consequence, the data bit hypotheses, or at least a portion thereof, should represent data bits that will also be carried in the subsequent data block.

The data bit hypotheses $\hat{c}_k$ could be hard decisions formed by the decoder 310 on the estimated data bits. For example, $$\hat{c}_k = \begin{cases} 1 & \lambda_k > 0 \\ 0 & \lambda_k \leq 0, \end{cases} \quad (2)$$

where $\lambda_k$ is the output (estimated coded data bits) from the demodulator 200. Alternatively, the bit hypotheses could be soft decisions, such as:

$$\hat{c}_k = \tan h(\lambda_k). \quad (3)$$

Actually any hypotheses of the data bits can be used according to the present invention, including possible soft values, such a log-likelihood ratios (LLR), hard values and other information expressions of the data bits in the first data block. These data bit hypotheses are then (temporarily) stored in a data buffer or memory 400 connected to the data processor 300 and decoder 310.

At a subsequent data transmission, e.g. due to that the decoder 310 was unable to correctly decode the first data block, the receiver 1 receives a second data block originating from the same transmitter and being based on information common to the first and second block. At this subsequent block reception, the data bit hypotheses, or at least a portion thereof, are fetched from the buffer 400 and input to a modulator 320 that is part of the data processor 300. The modulator 320 modulates the bit hypotheses to generate data symbol hypotheses. Since these symbol hypotheses have correspondences with (at least some of) the data symbols in the second data block they can be utilized as "known pilot or reference symbols" in the channel response estimation for the second data block.

In a first embodiment only, these generated symbol hypotheses from the modulator are input to the channel estimator 100 together with the received symbols of the second block. However, if the second data block includes or is associated with (e.g. through a parallel pilot channel) pilot symbols, also reference pilot symbols can be input to the estimator in addition to the symbol hypotheses and the received symbols. Thus, in this embodiment of the invention much more reference symbols (the symbol hypotheses and the pilot symbols) are utilized by the estimator 100 in the channel response estimation process than prior art solutions that only employs a few pilot symbols. Furthermore, this increase in reference symbols for the purpose of channel estimation can be obtained without any increase in the number of pilot symbols that have to be included in the data block and, thus, without any reduction in the information data throughput. As a consequence, a much more accurate channel estimation for this second data block will be obtained, which in turn enables a more accurate estimation of the data bits of the block and increased probability of successful decoding.

In cases where the second data block includes a first set of symbols that represent data bits common to the first and second data block and a second set of symbols that represent data bits that have no correspondence in the first block, the receiver 1 or estimator 100 is preferably able to identify the common symbols, i.e. the first symbol set. This symbol identification can be realized using information included in the data block, e.g. in a header portion of the block, and which has been entered by the transmitter. Alternatively, such identification information can be sent separately to the receiver. In a further solution, the common symbol set could have a predefined position within the radio block, such as found among the first (last) symbols in the block.

Similar to above, if the received symbols in the second data block can be represented by $y_k = \alpha_k x_k$, the channel estimator 100 uses locally generated or stored pilot reference symbols and the data symbols hypotheses ($x_j$, j=1 ... $N_p + N_h$, where $N_p$ is the number of pilot symbols associated with the data block and $N_h$ is the number of symbol hypotheses). As a consequence, $N_h$ more reference symbols can be used in the channel estimation of the second data block compared to the estimation in connection with the first block.

The estimator 100 determines a channel estimation based on the reference data (pilot data and symbol hypotheses) and outputs it to the modifying unit 525. The data symbols of the second block are also input to this modifying unit 525 and a sequence of estimated data symbols for this second block is obtained, which was discussed in more detail for the first data block above. The estimated data symbols are brought to the demodulator 200 for generating estimated bit symbols, which in turn are brought to the decoder 310 for decoding. If the data bits can be successfully decoded, hard decisions thereof can be made, either in the decoder 310 or in another unit of the receiver 1 (not illustrated).

In addition, or in particular if the data bits were not successfully decoded, the decoder 310 can generate data bit hypotheses of the data bits in the second data block or at least of a portion thereof. These data bit hypotheses can be brought to the data buffer 400 for storage.

If the receiver 1 subsequent receives, from the transmitter in a third data transmission, a third data block that is based on information (data bits) common to this third and the second (first) data block, the stored data bit hypotheses of the second (first) block can be used in the channel estimation for the third data block. If all these three blocks are generated in the transmitter based on common information, data bit hypotheses of both the first and second block can be used by the channel estimator 100. This procedure can be repeated in an iterative manner for multiple subsequent data blocks and transmissions, where each such data block is based on information common to at least one previously received (original) data block.

Thus, for every new (re)transmission, more reference data (data bit hypotheses) and more accurate such reference data can be used by the channel estimator 100. Since for each data bit hypotheses calculation, the new hypotheses are probably more accurate than a preceding one, in some applications it is sufficient to only use the most recent bit hypotheses in the channel estimation for a new data block. Alternatively, data bit hypotheses associated with different data blocks and stored in the data buffer 400 may be combined in a suitable manner, e.g. averaged, possibly using different weights, to obtain a single combined bit hypotheses sequence that is used in the channel estimation for a subsequent data block.

The units 100, 200, 300, 310, 320 and 525 of the receiver 1 may be provided as software, hardware or a combination thereof. The receiver 1 may in turn be arranged in any communicating terminal or unit, including mobile units and stationary communicating units, such as base stations, adapted for wireless data communication.

Figure 4:
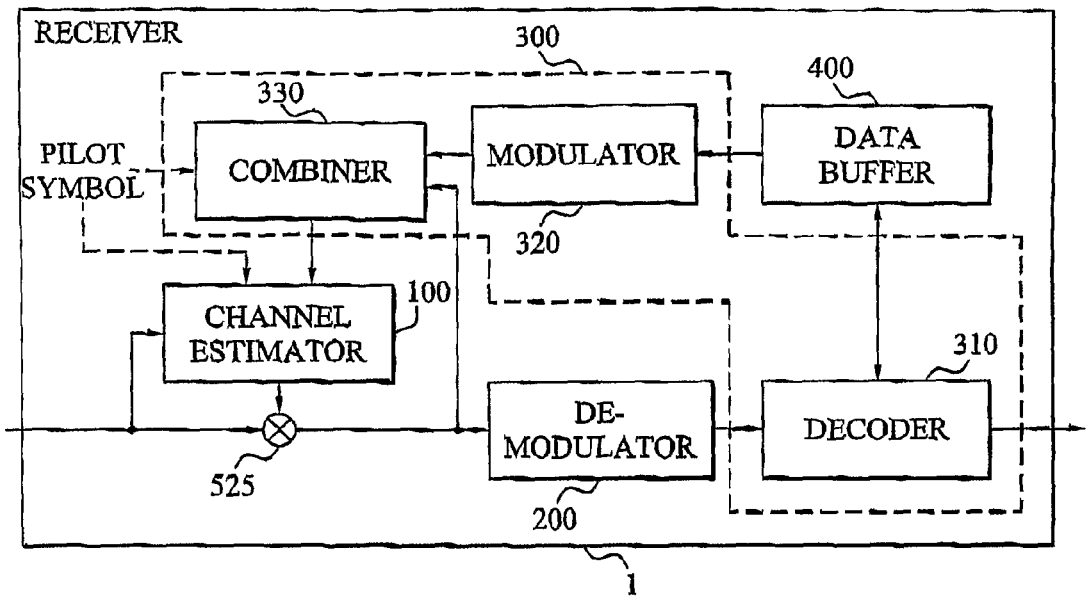
FIG. 4 is a schematic block diagram of another embodiment of a receiver according to the present invention.

FIG. 4 is a schematic block diagram of another embodiment of a receiver 1 according to the present invention. This embodiment includes another data processor 300 compared to the embodiment of FIG. 3.

Correspondingly to the receiver of FIG. 3, when the receiver 1 receives a first data block, the channel estimator 100 determines a channel response estimation, possibly using pilot symbols associated with the first data block. This estimated channel response is used for producing data symbol estimates of the block in the modifying unit 525. These symbol estimates are demodulated in the demodulator 200 into estimated data bits, which are brought to the data processor 300 and the decoder 310 therein. The decoder 310 can determine data bit hypotheses of the first data block, in particular if unable to successfully decode the data block, as was discussed in the foregoing. These bit hypotheses are stored in the data buffer 400 until a second data block is received in a subsequent data transmission.

When the receiver 1 receives this second data block, the channel estimator 100 determines an initial or preliminary channel response for this data block. This preliminary channel response estimation can be performed using pilot symbols associated with the second data block in a corresponding way to the channel estimation for the first data block. The so-obtained channel response estimate is brought together with the received data symbols of the second block to the modifying unit 525 for generating preliminary estimated data symbols.

The bit hypotheses associated with the first data block are fetched from the data buffer 400 and input to a modulator 320 of the data processor 300. The modulator 320 modulates the bit hypotheses to generate data symbol hypotheses, which are provided to a symbol combiner 330 of the data processor 300. Also the preliminary estimated data symbols of the second block are provided from the modifying unit to this symbol combiner 330. This symbol combiner 330 then operates for combining at least a portion of the data symbol hypotheses of the first block with at least a portion of the preliminary estimated data symbols of the second block to generate combined reference data that can be used in a second or refined (enhanced) channel estimation for the second data block.

Any symbol combining technique known in the art can be used by the combiner 330 including, but not limited to, symbol averaging, weighted symbol averaging or a simple symbol multiplexing.

These combined symbol references are output from the combiner 330 and provided together with the received data symbols of the second block (that has been temporarily stored in a data memory) to the channel estimator 100. Alternatively, also pilot symbols of the second block could be provided to the estimator 100 or such pilot symbols could have been input to the combiner 330 and used in the symbol combining procedure.

Since more reference symbols can now be used by the estimator 100 (combination of symbol hypotheses, estimated data symbols and pilot symbols compared to only pilot symbols), a more accurate and refined estimation of the channel response can be obtained for the second data block compared to the previously determined preliminary channel estimate. This refined channel estimate and the data symbols of the second data block are input to the modifying unit 525 for generating refined estimations of the data symbols.

These refined data symbol estimations can in turn be combined with the symbol hypotheses of the first block in the symbol combiner 330. And the iterative channel estimation procedure employing the channel estimator 100, modifying unit 525 and symbol combiner 330 can be repeated several times until adequate data symbol estimations are obtained for the second data block. However, for most practical implementations no more channel response calculations than the preliminary and first refined ones are typically required.

In either case, the final (refined) symbol estimations of the second data block are demodulated in the demodulator 200 and the so-obtained estimated data symbols of the second data block are brought to the decoder 310.

As was discussed in connection to FIG. 3, the decoder 310 can determine data bit hypotheses for these estimated data bits of the second block and store them in the data buffer 400. Then bit hypotheses of the first block and/or the second block can be used in the refined channel estimation of a subsequently received third data block.

The units 100, 200, 300, 310, 320, 330 and 525 of the receiver 1 may be provided as software, hardware or a combination thereof. The receiver 1 may in turn be arranged in any communicating terminal or unit, including mobile units and stationary communicating units, such as base stations, adapted for wireless data communication.

Figure 5:
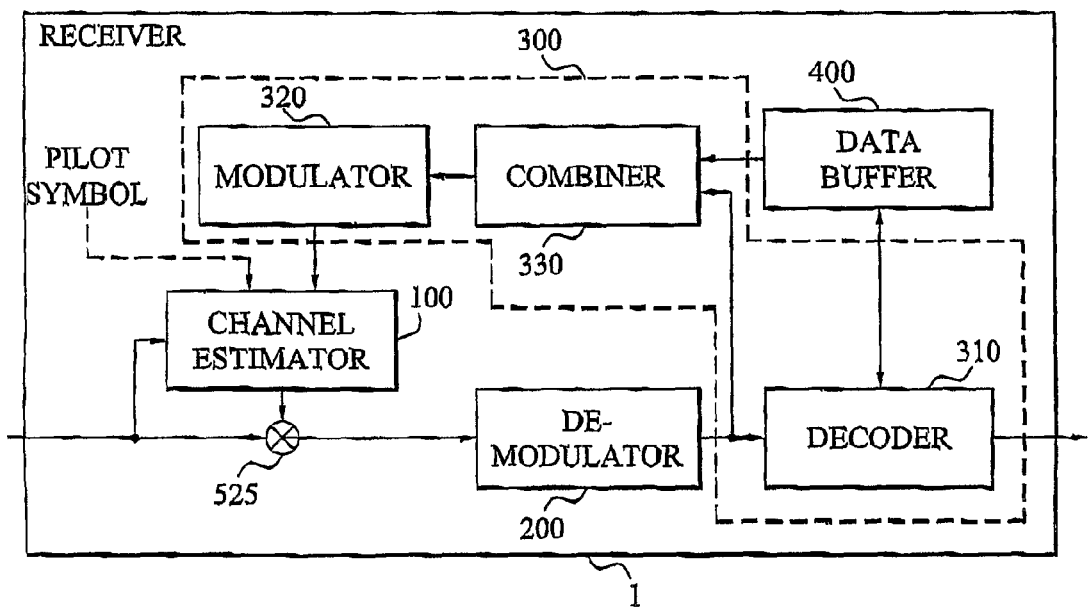
FIG. 5 is a schematic block diagram of a further embodiment of a receiver according to the present invention.

FIG. 5 is a schematic block diagram of a further embodiment of a receiver 1 according to the present invention. Data bit hypotheses of a first data block are generated by the receiver 1 in a similar way to the receiver in FIGS. 3 and 4 and this hypotheses generation procedure is not further discussed. Thus, the data buffer 400 stores data bit hypotheses of the first data block at the time of reception of a second data block in the receiver 1.

The channel estimator 100 then determines an initial or preliminary channel response for this second data block as was discussed above in connection with FIG. 4. This preliminary channel response is used by the modifying unit 525 for modifying the received data symbols for the purpose of removing the effect of the symbols caused by the data channel. Preliminary estimated data symbols are output from the modifying unit 525 and brought to the demodulator 200. This demodulator 200 then demodulates the data symbols to generate preliminary estimated data bits. At least a portion of these estimated data bits of the second data block are combined in a bit combiner 330 of the data processor 300 with at least a portion of the data bit hypotheses of the first data block, retrieved from the buffer 400. Correspondingly to the symbol combiner in FIG. 4, this bit combiner 330 can operate with any bit combining technique known in the art, e.g. a bit averaging technique, a weighted averaging or a simple bit multiplexing. The resulting combined reference bits are provided to a modulator 320 arranged in the data processor 300 for modulating the reference bits into combined reference symbols.

These combined symbol references are output from the modulator 320 and provided together with the received data symbols of the second block (that has been temporarily stored in a data memory) to the channel estimator 100. Alternatively, also pilot symbols of the second block could be provided to the estimator 100.

Since more reference symbols can now be used by the estimator 100 (combination of symbol hypotheses, estimated data symbols and pilot symbols compared to only pilot symbols), a more accurate and refined estimation of the channel response can be obtained for the second data block compared to the previously determined preliminary channel estimate. This refined channel estimate and the data symbols of the second data block are input to the modifying unit 525 for generating refined estimations of the data symbols.

This channel response and data symbol refinement can be repeated at least once more. However, in most practical implementations, the refined channel response is accurate enough to generate a good estimation of the data symbols of the second block so that no more refinement is required. In such a case, the refined data symbol estimates of the second block are demodulated by the demodulator 200 into refined bit symbol estimates that, hopefully, can be decoded by the decoder 310. Similar to above, data bit hypotheses of the second data block can be generated by the decoder 310 in addition to decoding the data bits or, preferably, instead of decoding the data bits due to unsuccessful data bit decoding.

The units 100, 200, 300, 310, 320, 330 and 525 of the receiver 1 may be provided as software, hardware or a combination thereof. The receiver 1 may in turn be arranged in any communicating terminal or unit, including mobile units and stationary communicating units, such as base stations, adapted for wireless data communication.

It is anticipated by the invention that the different embodiments of the receiver discussed above and illustrated in FIGS. 3 to 5 can be, at least partly, combined.

Briefly returning to FIG. 1, the data block carrying signal transmitted from the base station 20 generally arrives via multiple paths or channels 30 (of which only one is illustrated in the figure) at the receiver 1. This is because the transmitted signal bounces off anything, such as the ground, mountains, buildings and other objects, it comes into contact with. These multi-path signals are typically out of phase with each other, which causes the signal to interfere with itself. However, by combining such multi-path signals in the receiver 1, the total signal strength can be increased, thus, raising the quality of the received signal. As a consequence, the receiver 1 can include multiple so-called "fingers", where each such finger is timed to receive a different multi-path signal.

Note however that each such multi-path signal originates from one and the same data block transmission. Thus, the multi-path signals carry the same data block, but since the modifying effect of the paths or channels can differ, a channel response is preferably estimated for each such channel in the receiver. Each such receiver finger can then include a respective channel estimator and modifying unit as discussed above for the embodiments disclosed in FIGS. 3 to 5. In other words, data bit hypotheses of a previous data block is used for generating known reference symbols that are used in the channel estimation for such paths or channels associated with a single subsequent data block transmission. The resulting different sequences of estimated data symbols for the subsequent data block can be combined before being demodulated.

As was noted in the foregoing, the present invention can be applied to usage of the HARQ scheme and HARQ-adapted receivers. The invention will now be further described with reference to receivers adapted for CC, PIR and FIR modes of HARQ.

Figure 6:
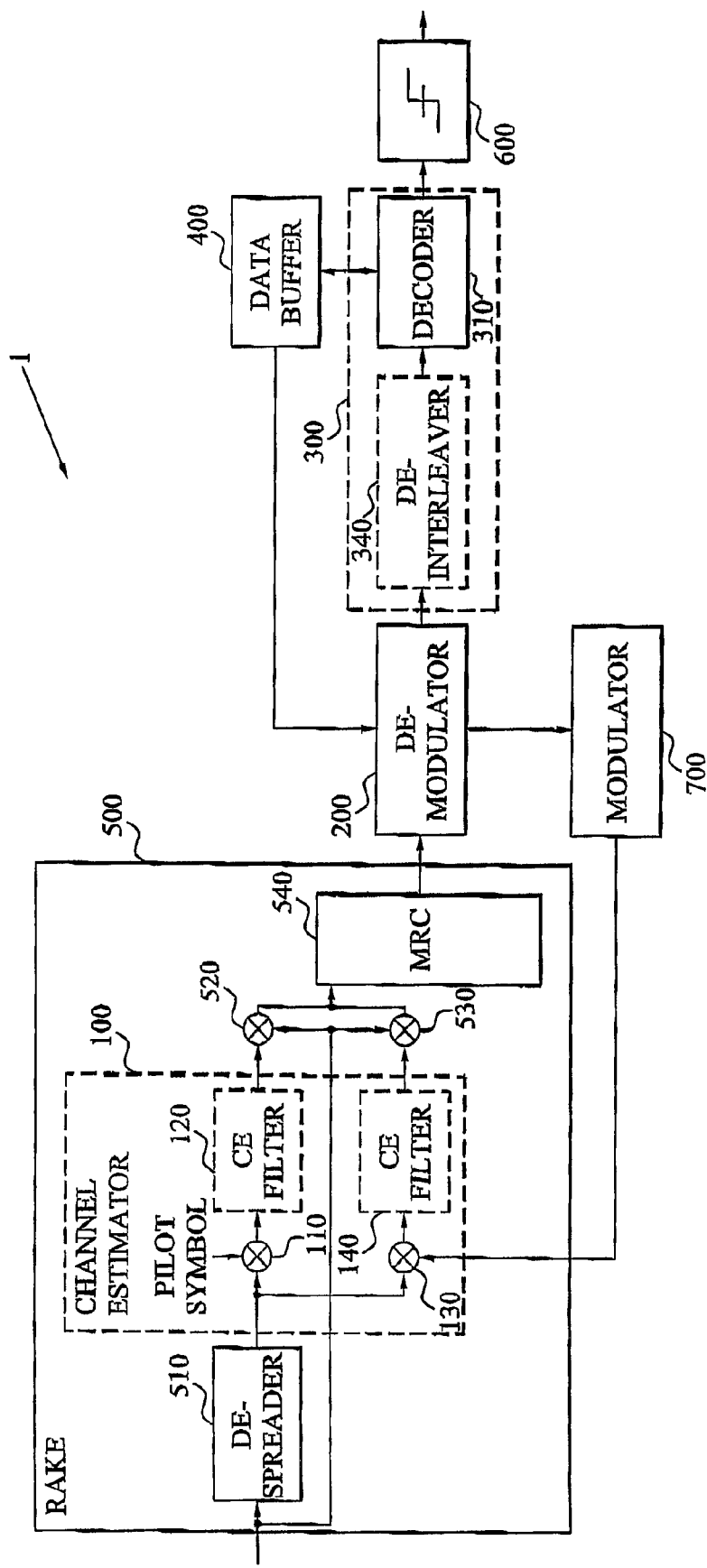
FIG. 6 is a schematic block diagram of an embodiment of a receiver according to the present invention suitable for CC mode of HARQ.

FIG. 6 schematically illustrates a block diagram of a receiver 1 adapted for CC mode of HARQ. The data block carrying signals from a first data transmission is input a respective finger of a RAKE combiner or receiver 500. Note that the CC-, PIR- and FIR-adapted embodiments of the invention are not limited to usage of RAKE receivers or combiners. On the contrary, any kind of receiver/combiner structure, e.g. minimum mean square error (MMSE) combiner, in the art can be used. As a consequence, the usage of RAKE for these embodiments should merely be seen as a non-limiting example.

FIG. 6 illustrates one such finger of the RAKE combiner 500. The respective signals are optionally first input to a descrambling and despreading unit 510 to obtain a despread and descrambled version of the data block (signal):

$$y = \frac{1}{SF} \sum_{i=0}^{SF-1} x(i) c_{scr}(i) c_{ch}(i), \qquad (4)$$

where $c_{ch}$ is the real valued channelization code with spreading factor SF and $c_{scr}$ represents the complex scrambling code.

Similar to above, the channel estimator 100 includes means 110 for determining a channel response estimate for the current path or channel, preferably utilizing pilot symbols included in the first data block. Thus, locally generated or stored reference symbols could be input to a modifying unit 110 together with received pilot symbols for generating the channel estimation. The resulting channel estimate $\hat{\alpha}_l^*$, where l=1 ... L and L is equal to the number of fingers of the RAKE combiner 500, may optionally be filtered in a channel estimate filter 120. General speaking, a good channel estimate filter 120 can reduce noise and tracking the time variant change of the channel. Classical such filters 120 include Wiener filters, simple average (SA), linear interpolation (LI) and weighted multi-slot averaging (WMSA).

The possibly filtered channel response estimate is brought to a modifying unit 520 that also receives the data symbols sequence of the first data block. The received data symbols are modified by the channel response, e.g. multiplied by the complex conjugate of the channel response, in the modifying unit 520 to generate an estimated data symbol sequence for this RAKE finger. The different such estimated data symbols sequences associated with the first data block from the different fingers are combined, for example, in a maximum ratio combiner (MRC) 540. As a consequence, modifying units 520 in the RAKE combiner 500 multiply the symbols from each path with the complex conjuagate of the possibly filtered channel estimate corresponding to that path, and then after adjusting for the different path delays, the MRC 540 combines the corresponding symbols estimates of the different paths to generate a single estimated symbol stream $y_{MRC}$:

$$y_{MRC} = \sum_{l=1}^{L} y_l \hat{\alpha}_l^*. \qquad (5)$$

The MRC output stream is demodulated in a demodulator 200 to produce an estimated data bits sequence for the first data block. This demodulator 200 can be implemented as a soft input—soft output (SISO) demodulator operating in the LLR domain. In such a case the estimated data bit sequence can be represented as:

$$\lambda(v_k^i = b) = \log \sum_{x_k \in \chi_b^i} P(y_k | x_k) \qquad (6)$$

$$\approx \max_{x_k \in \chi_b^i} (\log P(y_k | x_k))$$

$$= -\min_{x_k \in \chi_b^i} \left\| y_k^{MRC} - \sum_{l=1}^{L} y_l \hat{\alpha}_l^* \right\|^2,$$

where $\chi_b^i$ is the subset of $\chi$ whose label has the binary value b at the $i^{th}$ bit position and $v_k$ is a data symbol at the $k^{th}$ position formed by m consecutive bits. More information of operation of a SISO demodulator can be found in the reference [3].

The estimated bits sequence is input to a data processor 300 that could include an optional deinterleaver 340. As is known in the art, an interleaver is often included in the transmitter for breaking the sequential fading correlation and increase diversity order to the minimum Hamming distance of a code. If such an interleaver was used in the transmitter, the receiver 1 preferably includes a deinterleaver 340. The possibly deinterleaved estimated bits sequence is input to a decoder 310. Typical non-limiting examples of suitable decoders 310 according to the present invention include a soft-output Viterbi decoder or a turbo decoder. In such decoders 310, extrinsic information, e.g. LLR values, of information bits can be calculated, for example, through maximum a posteriori algorithm (MAP) or soft output Viterbi algorithm (SOVA) and exchanged between two component recursive systematic convolution (RSC) decoders. Actually, not only information bits, but also parity bits can be obtained with the MAP or SOVA algorithm. As a consequence, these generated LLR values of coded bits, including information and parity bits, of the first data block from the decoder 310 can then be used as data bit hypotheses. In this receiver 1, these data bit hypotheses (LLR bit values) can be sent to the (SISO) demodulator 200 as a priori information during a subsequent data block transmission. In other words, extrinsic a posteriori bit probabilities (data bit hypotheses) output by the decoder 310 can be fed back as the a priori probabilities to the demodulator 200 for the subsequent data block. Thus, these data bit hypotheses are (temporarily) stored in the data buffer 400.

In CC mode of HARQ, if decoding of the first data block is unsuccessful, this data block is retransmitted or a (identical) copy of the first block is transmitted to the receiver. Upon reception of this retransmitted second data block, an initial or preliminary channel estimation procedure is performed in the RAKE combiner 500. This preliminary channel estimation basically corresponds to the channel estimation for the first data block discussed above. The output from the RAKE combiner 500, thus, a preliminary estimated data symbols sequence for the second (retransmitted) data block is then brought to the demodulator 200.

Contrary to the first data block, the stored data bit hypotheses (LLR values) are fetched from the data buffer 400 and input to the demodulator 200 as a priori information during the demodulation of the second data block. As a result of this data bit hypotheses input, the accuracy of the demodulation can be improved significantly. At the demodulator 200, the MAP bit metrics are calculated as:

$$\lambda(v_k^i = b) = \log \sum_{x_k \in \chi_b^i} P(v_k^i = b | y_k) \qquad (7)$$

$$= \log \sum_{x_k \in \chi_b^i} P(x_k | y_k)$$

-continued $$\propto \log \sum_{x_k \in \chi_b^i} P(y_k \mid x_k) P(x_k).$$

Where the a priori probability $P(x_k)$ can be computed by:

$$P(x_k) = \prod_{i=1}^{m} P(v_k^i = \hat{v}_k^i(x_k)), \quad (8)$$

where $\hat{v}_k^i(x_k)$ is the value of the $i^{th}$ bit of the label corresponding to $x_k=\mu(\hat{v}_k)$ and $\mu$ is the labeling map that maps each symbol $v_k$ to a complex transmitted symbol (signal) $x_k$ chosen from M-ary constellation, $M=2^m$. Combining equation (7) and (8), the demodulator output (extrinsic a posteriori bit probabilities) can be written as:

$$P(v_k^i = b) = \sum_{x_k \in \chi_b^i} P(y_k \mid x_k) \prod_{\substack{j \neq i \\ j=1}}^{m} P(v_k^j = \hat{v}_k^j(x_k)), \quad (9)$$

or in the LLR-domain:

$$L(v_k^i) = \log \frac{\sum_{x_k \in \chi_1^i} \exp\left(-\frac{1}{2\sigma_n^2}\left\|y_k^{MRC} - \sum_{l=1}^{L} y_l \hat{\alpha}_l^*\right\|\right) \prod_{\substack{j \neq i \\ j=1}}^{m} P(v_k^j = \hat{v}_k^j(x_k))}{\sum_{x_k \in \chi_0^i} \exp\left(-\frac{1}{2\sigma_n^2}\left\|y_k^{MRC} - \sum_{l=1}^{L} y_l \hat{\alpha}_l^*\right\|\right) \prod_{\substack{j \neq i \\ j=1}}^{m} P(v_k^j = \hat{v}_k^j(x_k))}. \quad (10)$$

More information of operation of a SISO demodulator can be found in Aik Chindapol and James A. Ritcey, "Design, analysis, and performance evaluation for BICM-ID with square QAM constellations in Rayleigh fading channels", *IEEE Journal on Selected Areas in Communications*, Vol. 19, No. 5, pp. 944-957, May 2001.

The demodulator output (preliminary estimated data bits) will be used as reference data in a refined channel estimation for the second data block. Firstly, the demodulator output is provided to a modulator 700 for generating estimated data symbols. Alternatively, the demodulator output can first be provided to the decoder 310 for generating hard or soft decisions, e.g. according to equation (2) or (3) above. In such a case, in for instance Quadrature Phase Shift Keying (QPSK), the real part of the data symbol decision is equal to the value of odd positions of $\hat{c}_k$, while the imaginary part is determined by the value of even positions of $\hat{c}_k$. The resulting (hard or soft) decisions are then forwarded to the modulator 700.

This modulator 700 generates data symbol hypotheses of the demodulator output or the bit decisions from the decoder 310. The data symbol hypotheses are used as reference symbols by the channel estimator 100. As a consequence, the reference data symbol hypotheses are input together with the previously despread and descrambled second data block to a modifying unit 130. In addition, also any pilot reference symbols can be input to this modifying unit 130 to increase the number of used reference symbols even further. Instead of using a dedicated modifying unit 130 for this channel estimate refinement, the same modifying unit 110 as was used for the first data block and the preliminary channel estimation for the second block can be reused also in the channel response refinement. In either case, the output from this modifying unit 130 (or alternatively unit 110) is a refined and more accurate channel estimate for this RAKE finger.

The refined channel response can be filtered as was discussed above using a dedicated filter 140 or by using the channel response filter 120 that was used for the preliminary channel response calculation.

The possibly filtered refined channel response is then input together with the received second data block in another modifying unit 530 (or alternatively the modifying unit 520 mentioned above) for generating refined data symbols estimates for this channel or path. These data symbols estimates for the different paths are combined in the MRC combiner 540 to generate a single sequence of refined data symbol estimates for the second data block.

The data symbols estimates could be demodulated in the demodulator 200 using a priori information (data bit hypotheses) of the first block from the data buffer 400 in order to refine the channel response and, thus, the data symbol estimates once more. However, for most implementations the data symbol estimates can be demodulated to data bit hypotheses that are forwarded to the deinterleaver 340 and then the decoder 310. If the decoder now is able to decode the provided (coded) data bits, a decision unit 600 can generate hard decisions of the (decoded) data bits. Alternatively, this hard decision functionality is included in the decoder 310. However, if the decoder 310 is still not able to decode the data block, data bit hypotheses (LLR-values) for this second data block can be generated and stored in the buffer 400 for usage, possibly together with the corresponding bit hypotheses of the first block, in a subsequent new data block retransmission.

In addition to improving the channel response estimation, this embodiment of the invention also improves the accuracy of demodulation, which in turn enables better (turbo) decoding performance.

The units 100, 110, 120, 130, 140, 200, 300, 310, 340, 500, 510, 520, 530, 540, 600 and 700 of the receiver 1 may be provided as software, hardware or a combination thereof. In addition, the units 130, 140 and 530 can be omitted and still obtain adequate operation performance. The receiver 1 may in turn be arranged in any communicating terminal or unit, including mobile units and stationary communicating units, such as base stations, adapted for wireless data communication.

Figure 7:
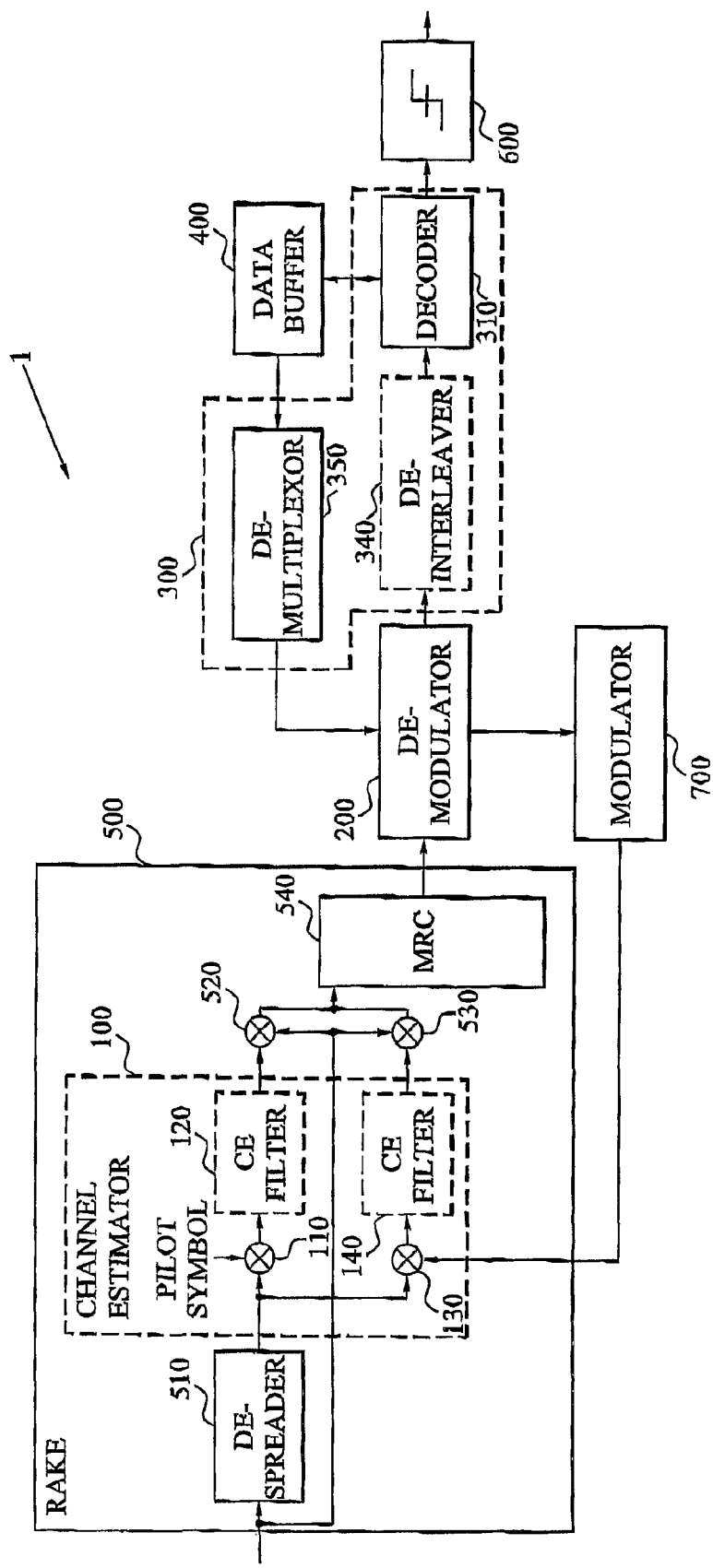
FIG. 7 is a schematic block diagram of an embodiment of a receiver according to the present invention suitable for PIR mode of HARQ.

Since the bits of the retransmission (second data block) are identical to that of the initial transmission (first data block) in the CC mode, all LLR values (data bit hypotheses) of the previous transmission can be utilized (as a priori data) in the demodulation of the current transmission. However, in the PIR mode, a requested retransmission carries identical bits and partly incremental bits to the initial transmission. Therefore, only a portion of the LLR values (data bit hypotheses) of the previous transmission will be useful for the current transmission. As a consequence, a receiver 1 adapted for operation in PIR mode is equipped with a demultiplexor or bit hypotheses selector 350 in the data processor 300, which is illustrated in FIG. 7.

The operation of this receiver 1 is similar to the receiver for CC mode discussed above in connection with FIG. 6 except usage of this demultiplexor 540. When the stored LLR values are to be fetched form the data buffer 400 and used as input a priori data in the demodulator 200, the demultiplexor 350 preferably distinguishes or selects those LLR values that are useful for the demodulation of the second data block. This demultiplexor 540 could alternatively be positioned between the decoder 310 and the data buffer 400 for selecting and, thus, only storing those LLR values that will be useful for processing the subsequent data block.

The units 100, 110, 120, 130, 140, 200, 300, 310, 340, 350, 500, 510, 520, 530, 540, 600 and 700 of the receiver 1 may be provided as software, hardware or a combination thereof. In addition, the units 130, 140 and 530 can be omitted and still obtain adequate operation performance. The receiver 1 may in turn be arranged in any communicating terminal or unit, including mobile units and stationary communicating units, such as base stations, adapted for wireless data communication.

Figure 8:
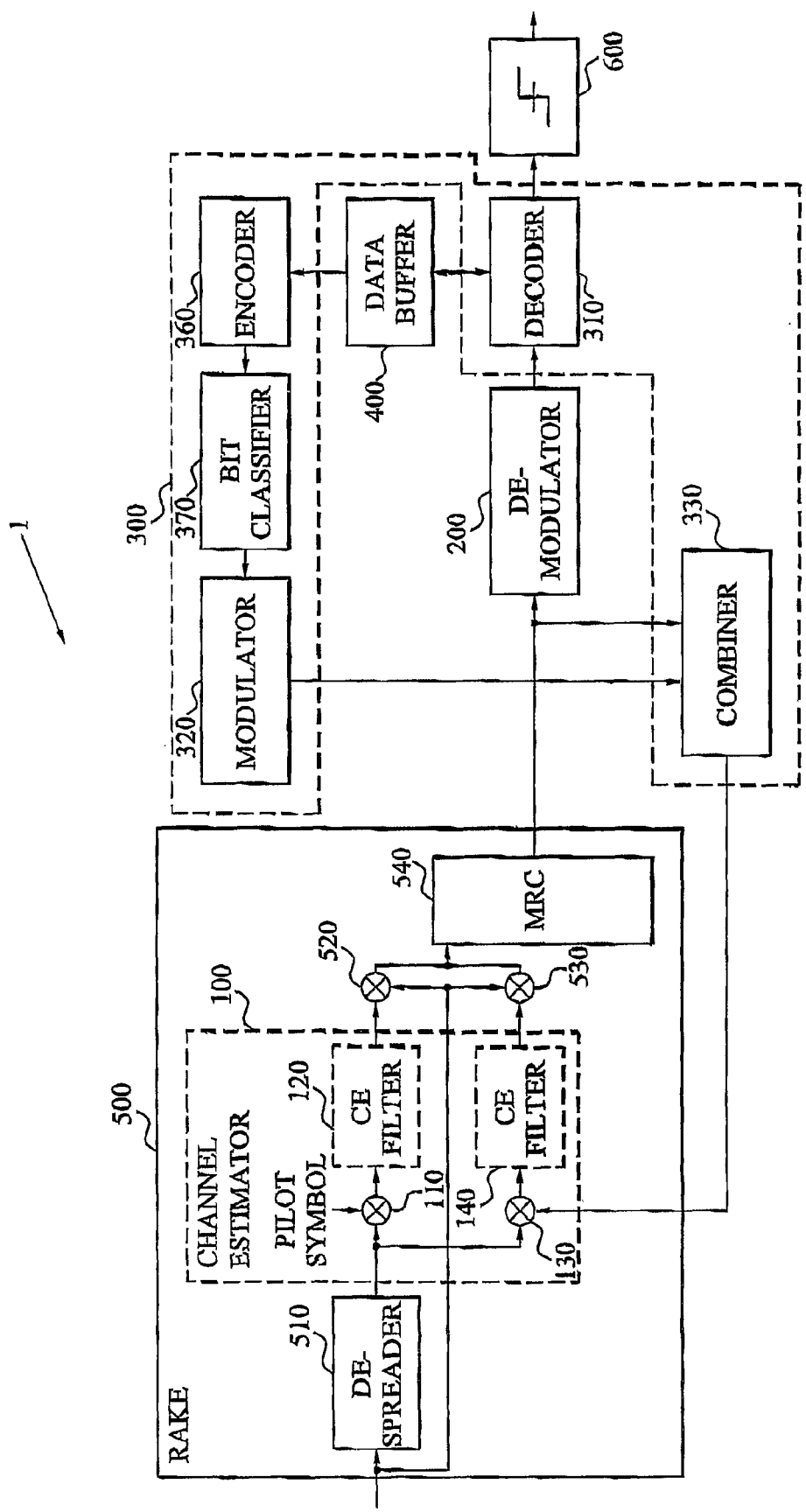
FIG. 8 is a schematic block diagram of an embodiment of a receiver according to the present invention suitable for FIR mode of HARQ.

FIG. 8 is a schematic block diagram of a receiver 1 adapted for operating in FIR mode. The operation of this is similar to the receivers operating in CC or PIR mode discussed above for the first received data block and for the generation of the initial or preliminary estimate of data symbols for the second subsequently received data block. As a consequence, the data buffer 400 stores decoded LLR values or data bit hypotheses of the first data block. These LLR values are then fetched from the memory and encoded in an encoder 360 of the data processor 300. The coded LLR values are classified into bits (1 or 0) in a bit classifier 370 before they are brought to a modulator 320 that generates data symbol hypotheses.

The data symbol hypotheses are combined with the preliminary estimated data symbols of the second data block from the MRC 540 of the RAKE combiner 500 in a symbol combiner 330. As was discussed in the foregoing, any symbol combining technique known in the art can be used by the combiner 330 including, but not limited to, symbol averaging, weighted symbol averaging or a simple symbol multiplexing.

The resulting combined data symbols will then be used as reference symbols in a refined channel estimation procedure for the second data block. As a consequence, the reference symbols are input to the channel estimator 100, possibly together with pilot symbols associated with the second data block. The refined channel response estimating procedure and the following processing of the resulting refined data symbol estimates of the second block is similar to the discussion above in connection with the CC receiver and is not repeated herein.

The units 100, 110, 120, 130, 140, 200, 300, 310, 320 330, 360, 370, 500, 510, 520, 530, 540 and 600 of the receiver 1 may be provided as software, hardware or a combination thereof. In addition, the units 130, 140 and 530 can be omitted and still obtain adequate operation performance. The receiver 1 may in turn be arranged in any communicating terminal or unit, including mobile units and stationary communicating units, such as base stations, adapted for wireless data communication.

The different embodiments discussed and disclosed above can be combined. For example, a receiver according to FIG. 7 can be operated both in CC and PIR mode. In the CC mode, the demultiplexor simply bypasses all inputted LLR values. Furthermore, a receiver that basically includes the units of the receiver in FIG. 7 and the receiver in FIG. 8 can be used for operating in the CC, PIR and FIR mode.

In order to evaluate the improvement of the receiver according to the present invention, a simulation chain is used. ½ code rate turbo code is adopted with 5 iterations SOVA decoding algorithm both in CC and IR HARQ transmission. The spreading factor SF is 128 with a rate of 3.84 M chips/s. Correlated frequency selective multi-path fading channel is designed with various channel gains and path delays. The speed of a mobile unit incorporating the receiver of the invention is fixed at 120 km/h. Without loss of generality, it is assumed that the maximum transmission number is 2 in both CC and IR transmission. The LI algorithm is used as channel estimate filtering technique and linear regression with 3 slots regression length is adapted.

Figure 9:
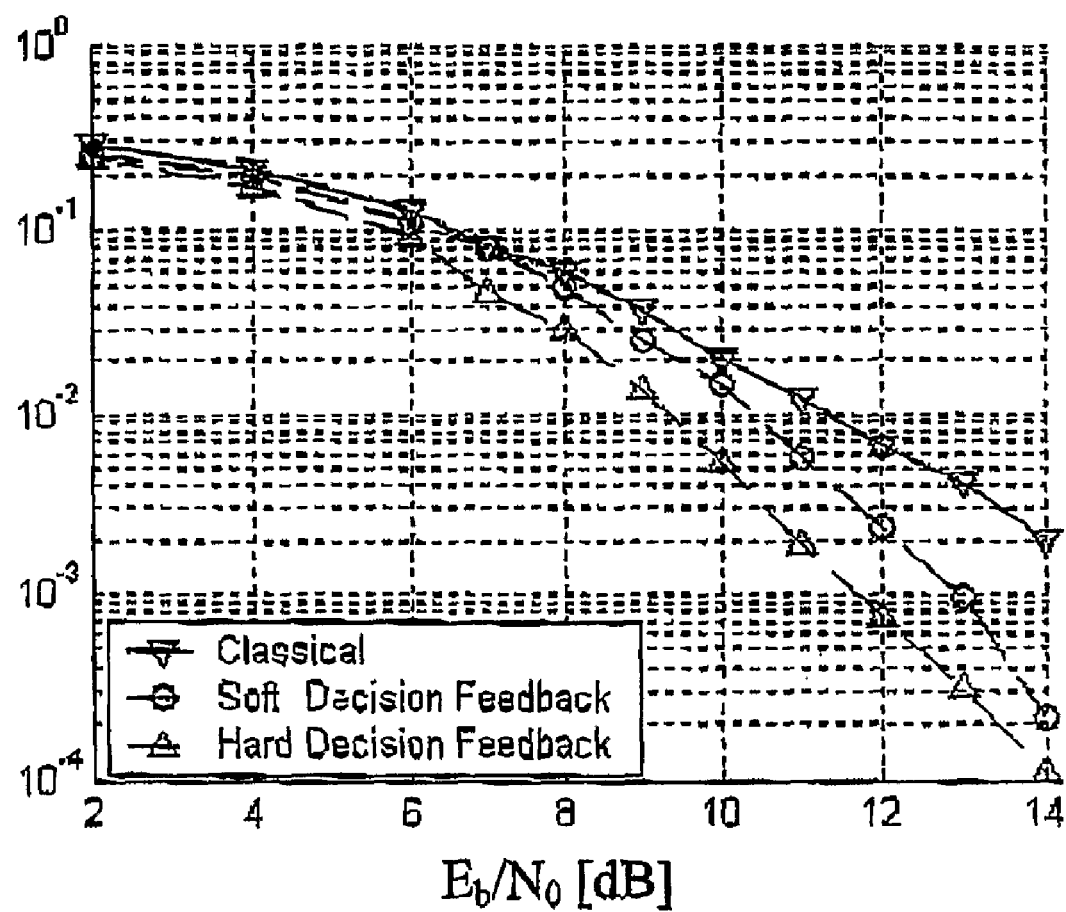
FIG. 9 is a diagram comparing the performance of a receiver according to the present invention with a prior art receiver for CC mode of HARQ.
Figure 10:
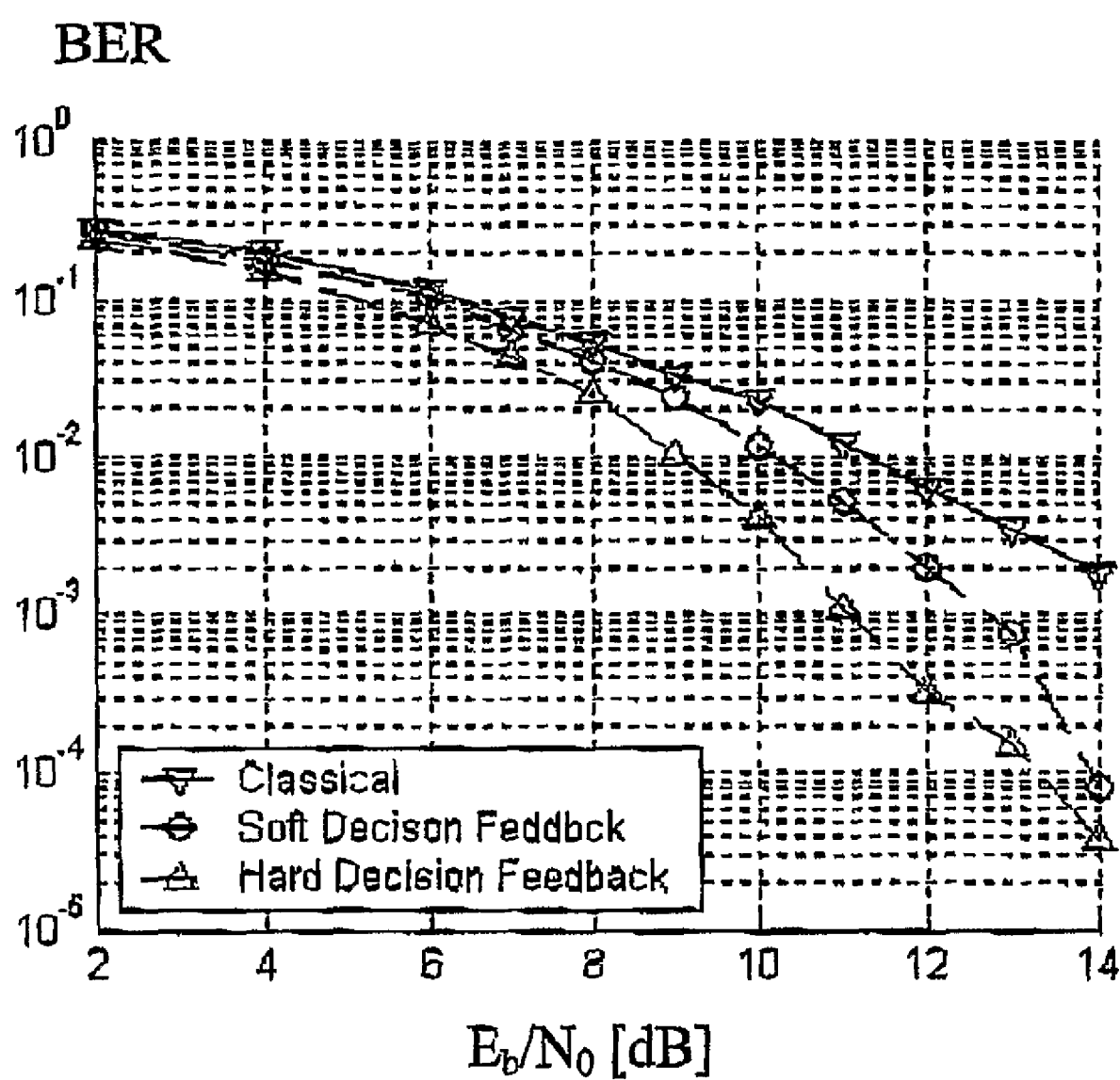
FIG. 10 is a diagram comparing the performance of a receiver according to the present invention with a prior art receiver for PIR mode of HARQ.

FIG. 9 is a comparison of the receiver employing soft or hard decision feedback with the classical technique (a version of the pilot symbol aided decision directed technique disclosed in the previously mentioned *Proc. Vehicular Technology Conference* 2000 document) employing pilot symbols in CC mode. The corresponding comparison diagram for PIR mode is found in FIG. 10. In the diagram BER represents Bit Error Ratio and $E_b/N_0$ is the Bit Energy-to-Noise Density.

It is clear from the two figures that the channel estimation technique according to the present invention outperforms the traditional one (i.e. decreases the BER) significantly with both soft decision feedback and hard decision feedback. For soft decision feedback, there are both amplitude estimation errors and phase estimation errors of data symbols, whereas for hard decision feedback there are only phase estimation errors. As a result, the performance with hard decision feedback may be better than that of soft decision feedback.

Figure 11:
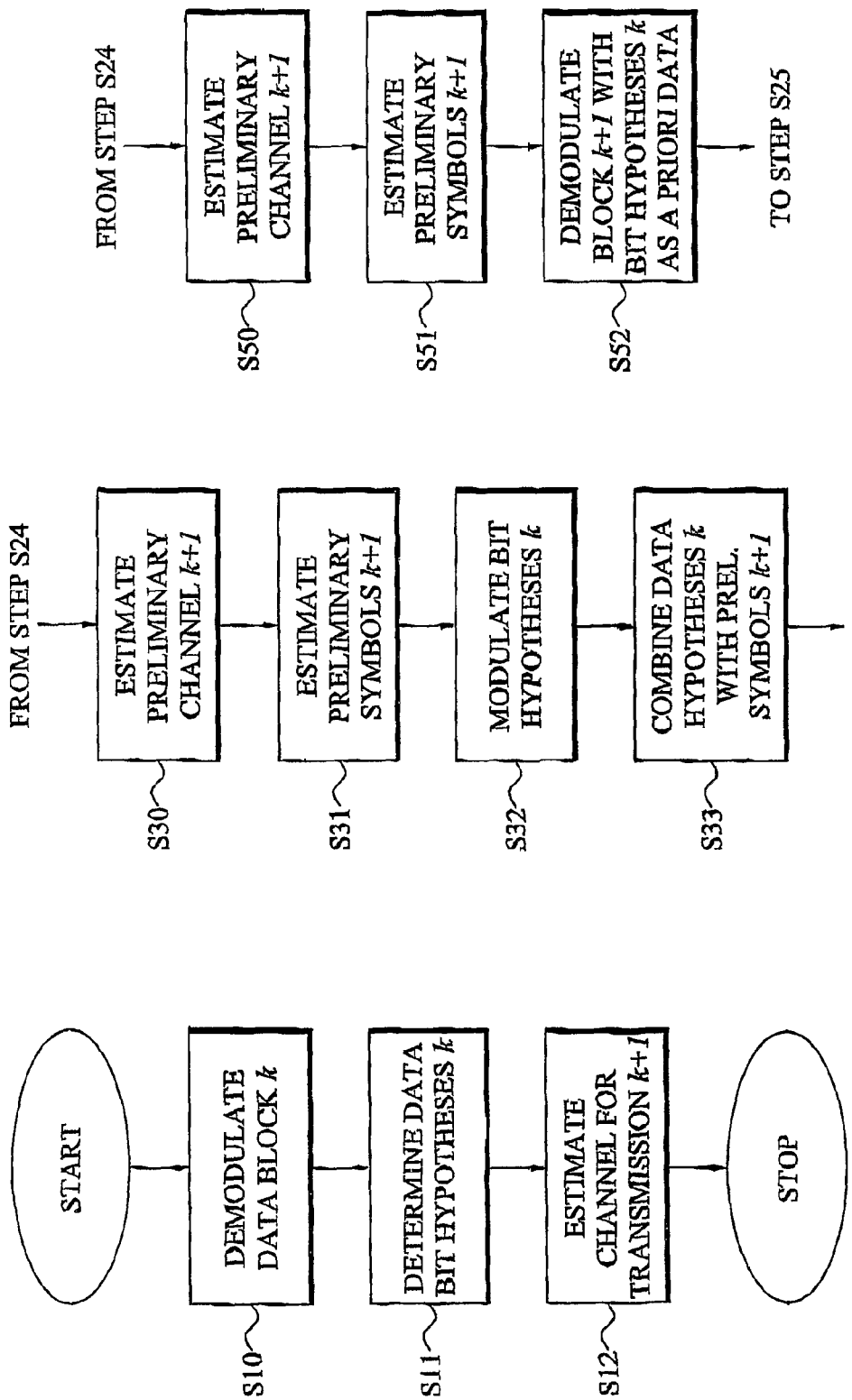
FIG. 11 is a flow diagram illustrating a channel response estimation method according to the present invention.

FIG. 11 is a block diagram illustrating a channel estimating method according to the present invention. The method starts in step S10, where a receiver receives a data block k, estimates a channel response for the block k and determines data symbol estimates. These data symbol estimates are then demodulated to get data bit estimates. These bit estimates are further processed in step S11 to generate data bit hypotheses. The data bit hypotheses of block k are used in the channel estimation for a subsequent block k+1 transmission, where block k and block k+1 are based on common information. The method then ends.

Figure 12:
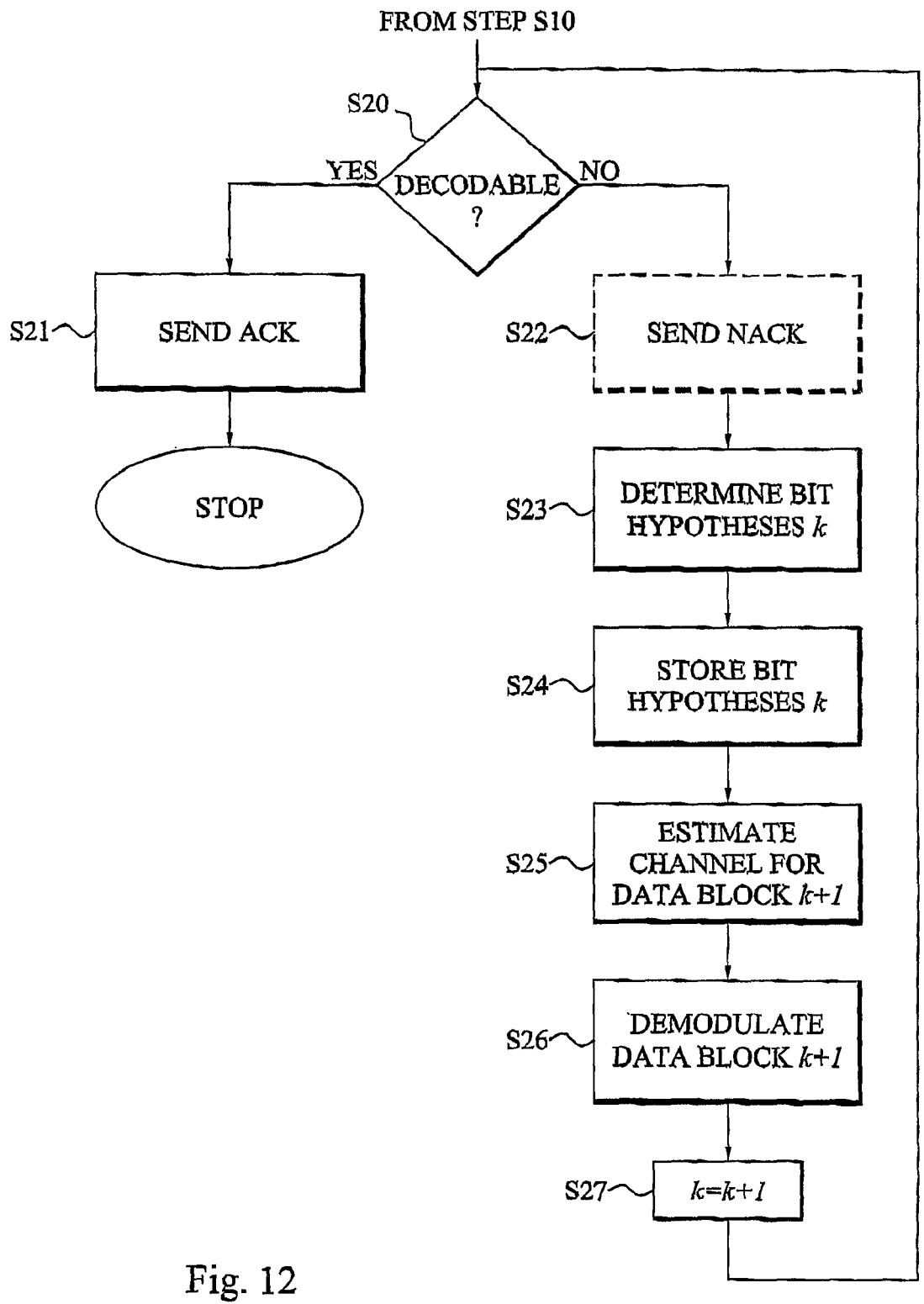
FIG. 12 is a flow diagram illustrating an embodiment of the bit hypotheses determining step and the channel estimating step of FIG. 11 in more detail.

FIG. 12 is a flow diagram illustrating an embodiment of the steps S11 and S12 of FIG. 11 in more detail. The method continues form step S10 of FIG. 11. In a next step S20, the receiver tries to decode the data bit estimates of block k. If decoding is successful, the receiver can return an acknowledgement (ACK) identifier to the transmitter in step S21 and the method ends. However, if the decoding could not be correctly performed, the receiver optionally instead returns a negative acknowledgement (NACK) to the transmitter in step S22. This NACK will cause the transmitter to either retransmit the data block or generate and transmit a new data block that, though, includes data symbols being based on data bits that are used for generating at least some of the data symbols of the data block k.

The receiver determines data bit hypotheses of the data block k in step S23 and stores them in a data memory or buffer in step S24. When the receiver receives this subsequent data block k+1 it fetches the bit hypotheses from the memory and uses them in the channel estimation for the block k+1 in step S25. The resulting channel estimate is used to obtain data symbol estimates for block k+1. These symbol estimates are demodulated in step S26, resulting in data bit estimates. The block counter k is increased by one in step S27. The method thereafter returns to step S20, where it is investigated whether the current data block k (which is thus the second subsequently received block) can be decoded. The loop of steps S20 and S22-S27 is repeated until the receiver can successfully decode a data block.

FIG. 13 is a flow diagram illustrating additional steps of the channel estimating method of FIG. 12. The method continues from step S24 of FIG. 12. In a next step S30, an initial or preliminary channel response is estimated for the data block k+1, possibly using pilot symbols included in the data block. This preliminary channel response is used for estimating preliminary data symbols of the block k+1 in step S31. A next step S32 modulates the stored data bit hypotheses of block k to determine data symbol hypotheses. At least a portion of the data symbol hypotheses of block k are combined with at least a portion of the preliminary estimated data symbols of block k+1 in step S33. The resulting symbol combination is employed as reference symbols in a refined channel estimation procedure for the data block k+1. The method, thus, continues to step S25 of FIG. 12.

Figure 14:
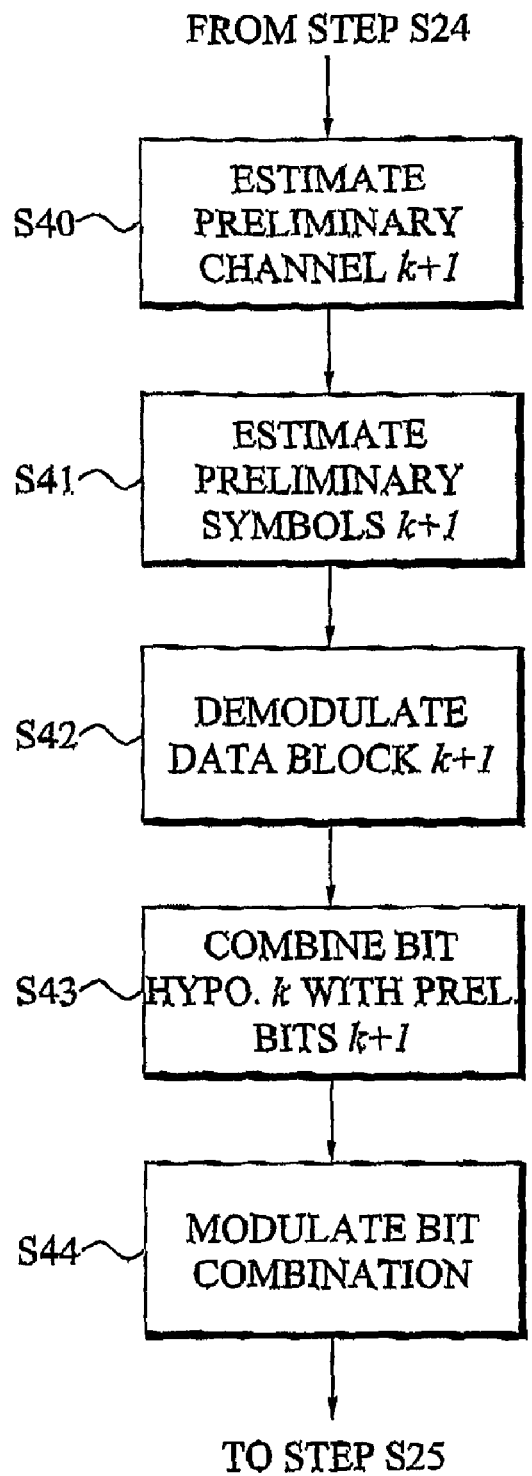
FIG. 14 is a flow diagram illustrating additional steps of the estimation method of FIG. 12.

FIG. 14 is a flow diagram illustrating additional steps of the channel estimating method of FIG. 12. The method continues from step S24 in FIG. 12. The two following steps S40 and S41 correspond to steps S30 and S31 of FIG. 13 and are not further discussed. In a next step S42, the preliminary data symbols of block k+1 are demodulated to generate preliminary estimated data bits. At least a portion of these estimated data bits of block k+1 are combined with at least a portion of the data bit hypotheses of block k in step S43. The resulting combined bits are modulated in step S44, resulting in reference data symbols that are used in a refined channel estimation for the data block k+1. The method continues to step S25 of FIG. 12.

FIG. 15 is a flow diagram illustrating additional steps of the channel estimation method of FIG. 12. The method continues from step S24 in FIG. 12. The two following steps S50 and S51 correspond to steps S30 and S31 of FIG. 13 and are not further discussed. In a next step S52, the preliminary data symbol estimates of block k+1 are demodulated using at least a portion of the data bit hypotheses of block k as input a priori information. Usage of such a priori information enhances the accuracy of the demodulation and result in more accurate data bit estimates of block k+1. These data bit estimates are modulated to obtain data symbol estimates that can be used as reference symbols in a refined channel estimation for the data block k+1. The method continues to step S25 of FIG. 12.

It will be understood by a person skilled in the art that various modifications and changes may be made to the present invention without departure from the scope thereof, which is defined by the appended claims.

REFERENCES

[1] Matthew C. Valenti and Brian D. Woerner, "Iterative channel estimation and decoding of pilot symbol assisted turbo codes over flat-fading channels", *IEEE Journal on Selected Areas in Communications*, Vol. 19, No. 9, pp. 1 697-1 705, September 2001

[2] Anna Zhuang and Markku Renfors, "Combined pilot aided and decision directed channel estimation for the RAKE receiver", *Proc. Vehicular Technology Conference* 2000, pp. 710-713, September 2000

[3] Aik Chindapol and James A. Ritcey, "Design, analysis, and performance evaluation for BICM-ID with square QAM constellations in Rayleigh fading channels", *IEEE Journal on Selected Areas in Communications*, Vol. 19, No. 5, pp. 944-957, May 2001

The invention claimed is:

1. A method of estimating a channel response for a data block transmission between a transmitter and a receiver, said method comprises the steps of, said receiver:
    demodulating a first data block of first data symbols, received from said transmitter in a first transmission, to obtain first estimated coded data bits;
    processing at least a subset of said first estimated coded data bits to obtain data bit hypotheses;
    said processing step further comprising modulating said data bit hypotheses to obtain data symbol hypotheses; and
    estimating a channel response for a subsequent transmission, in which said receiver receives a second data block of second data symbols from said transmitter, based on said data symbol hypotheses as known pilot symbols and at least a subset of said second data symbols, said first and second data blocks being based on common information.

2. The method according to claim 1, wherein said second data block is associated with known initial pilot symbols and said method comprises the steps of, said receiver:
    determining an initial channel response estimation for said subsequent transmission based on said known initial pilot symbols; and
    determining an initial estimation of said second data symbols based on said initial channel response estimation, wherein said processing step comprises combining at least a subset of the initially estimated second data symbols with said data symbol hypotheses, and said step of estimating said channel response is performed by utilizing the combination of said at least subset of said initially estimated second data symbols and said data symbol hypotheses as known pilot symbols.

3. The method according to claim 2, wherein said estimating step is performed by utilizing the combination of said initial pilot symbols, said initially estimated second data symbols and said data symbol hypotheses as known pilot symbols.

4. A method of estimating a channel response for a data block transmission between a transmitter and a receiver, said method comprises the steps of, said receiver:
    demodulating a first data block of first data symbols, received from said transmitter in a first transmission, to obtain first estimated coded data bits;
    demodulating a second data block of second data symbols received by said receiver in a subsequent transmission from said transmitter to obtain second estimated coded data bits;
    processing at least a subset of said first estimated coded data bits to obtain data bit hypotheses;
    said processing step further comprises:
        combining at least a subset of said second estimated coded data bits with said data bit hypotheses; and
        modulating the combination of said at least subset of said second estimated coded data bits and said data bit hypotheses to obtain a combined data symbol set; and
    estimating a channel response for said subsequent transmission based on said combined data symbol set as known pilot symbols and at least a subset of said second data symbols, said first and second data blocks being based on common information.

5. A method of estimating a channel response for a data block transmission between a transmitter and a receiver, said method comprises the steps of, said receiver:
    demodulating a first data block of first data symbols, received from said transmitter in a first transmission, to obtain first estimated coded data bits;
    processing at least a subset of said first estimated coded data bits to obtain data bit hypotheses;
    demodulating a second data block of second data symbols received by said receiver in a subsequent transmission from said transmitter utilizing said data bit hypotheses as a priori information to obtain second estimated coded data bits;

modulating at least a subset of said second estimated coded data to obtain a data symbol set; and estimating a channel response for said subsequent transmission based on said data symbol set as known pilot symbols and at least a subset of said second data symbols, said first and second data blocks being based on common information.

6. A receiver comprising:
a demodulator for demodulating a first data block of first data symbols, received from a transmitter in a first transmission, to obtain first estimated coded data bits;
a data processor connected to said demodulator and adapted for processing said first estimated coded data bits to obtain data bit hypotheses, said data processor comprises a modulator for modulating said data bit hypotheses to obtain data symbol hypotheses;
a channel response estimator connected to said data processor and adapted for estimating a channel response for a subsequent transmission, in which said receiver receives a second data block of second data symbols from said transmitter, based on said data symbol hypotheses as known pilot symbols and at least a subset of said second data symbols, said first and second data blocks being based on common information.

7. The receiver according to claim 6, wherein said second data block is associated with known initial pilot symbols and said channel response estimator comprises means for determining an initial channel response estimation for said subsequent transmission based on said known initial pilot symbols, said receiver further comprises means for determining an initial estimation of said second data symbols based on said initial channel response estimation, and said data processor comprises a symbol combiner for combining at least a subset of the initially estimated second data symbols with said data symbol hypotheses, and said channel response estimator is configured for estimating said channel response by utilizing the combination of said at least subset of said initially estimated second data symbols and said data symbol hypotheses from said symbol combiner as known pilot symbols.

8. The receiver according to claim 7, wherein said symbol combiner is configured for combing said initial pilot symbols, said data symbol hypotheses with said at least subset of said initially estimated second data symbols, and the channel response estimator is configured for estimating said channel response by utilizing the combination of said initial pilot symbols, said initially estimated second data symbols and said data symbol hypotheses from said symbol combiner as known pilot symbols.

9. A receiver comprising:
a demodulator for demodulating a first data block of first data symbols, received from a transmitter in a first transmission, to obtain first estimated coded data bits and for demodulating a second data block of second data symbols received by said receiver in a subsequent transmission from said transmitter to obtain second estimated coded data bits;
a data processor connected to said demodulator and adapted for processing said first estimated coded data bits to obtain data bit hypotheses, said data processor comprises:
a bit combiner for combining at least a subset of said second estimated coded data bits with said data bit hypotheses; and
a modulator for modulating the combination of said at least subset of said second estimated coded data bits and said data bit hypotheses from said bit combiner to obtain a combined data symbol set; and
a channel response estimator connected to said data processor and adapted for estimating a channel response for said subsequent transmission based on said combined data symbol set as known pilot symbols and at least a subset of said second data symbols, said first and second data blocks being based on common information.

10. A receiver comprising:
a demodulator for demodulating a first data block of first data symbols, received from a transmitter in a first transmission, to obtain first estimated coded data bits;
a data processor connected to said demodulator and adapted for processing said first estimated coded data bits to obtain data bit hypotheses; wherein said demodulator is further configured to demodulate a second data block of second data symbols received by said receiver in a subsequent transmission from said transmitter utilizing said data bit hypotheses as a priori information to obtain second estimated coded data bits;
a modulator for modulating at least a subset of said second estimated coded data to obtain a data symbol set; and
a channel response estimator connected to said data processor and adapted for estimating a channel response for said subsequent transmission based on said data symbol set as known pilot symbols and at least a subset of said second data symbols, said first and second data blocks being based on common information.

11. A channel response estimator arranged in a receiver for estimating a channel response for a data block transmission between a transmitter and said receiver, said channel response estimator is configured for estimating a channel response for a current transmission, in which said receiver receives a current data block from said transmitter, utilizing at least a subset of demodulated data symbols of said current data block as known pilot symbols, wherein said data symbols being demodulated with data bit hypothesis representations of demodulated data symbols as input a priori information, where said demodulated data symbols are comprised in a previous data block received from said transmitter in a previous transmission, said current and previous data block being based on common information.

* * * * *